United States Patent [19]

Laursen

[11] Patent Number: 4,643,614

[45] Date of Patent: Feb. 17, 1987

[54] METHOD AND APPARATUS FOR THE INSTALLATION OF A HOSE BETWEEN A PLATFORM AND A SUBMERGED BUOY

[75] Inventor: Nils K. Laursen, The Hague, Netherlands

[73] Assignee: Shell Oil Company, Houston, Tex.

[21] Appl. No.: 757,706

[22] Filed: Jul. 22, 1985

[30] Foreign Application Priority Data

Aug. 20, 1984 [NL] Netherlands ................. 8402545

[51] Int. Cl.⁴ .................................. F16L 1/04
[52] U.S. Cl. ............................. 405/169; 166/350; 405/195
[58] Field of Search ............... 405/158, 169, 195; 166/339, 341–345, 349, 350

[56] References Cited

U.S. PATENT DOCUMENTS

| | | | |
|---|---|---|---|
| 3,373,807 | 3/1968 | Fischer et al. | 166/349 X |
| 3,695,350 | 10/1972 | Petersen | 405/169 |
| 3,724,061 | 4/1973 | Schipper | 405/169 X |
| 3,866,677 | 2/1975 | Baugh | 166/349 X |
| 4,019,213 | 4/1977 | Behar et al. | 9/8 P |
| 4,367,055 | 1/1983 | Gentry et al. | 405/169 |
| 4,388,022 | 6/1983 | Gentry et al. | 405/195 |
| 4,400,109 | 8/1983 | Gentry et al. | 405/195 |

FOREIGN PATENT DOCUMENTS 1452916 11/1973 United Kingdom .
2090221 10/1981 United Kingdom .

Primary Examiner—David H. Corbin

[57] ABSTRACT

Catenary hoses are installed individually between a floating production platform and a submerged riser buoy. During installation the hose end to be installed on the submerged riser buoy is linked with a remotely controlled handling tool which is lowered onto the buoy and which subsequently pulls an end of the hose into a hose receptor on the buoy. The hose is similarly connected to the platform by use of another remotely controlled handling tool.

8 Claims, 9 Drawing Figures

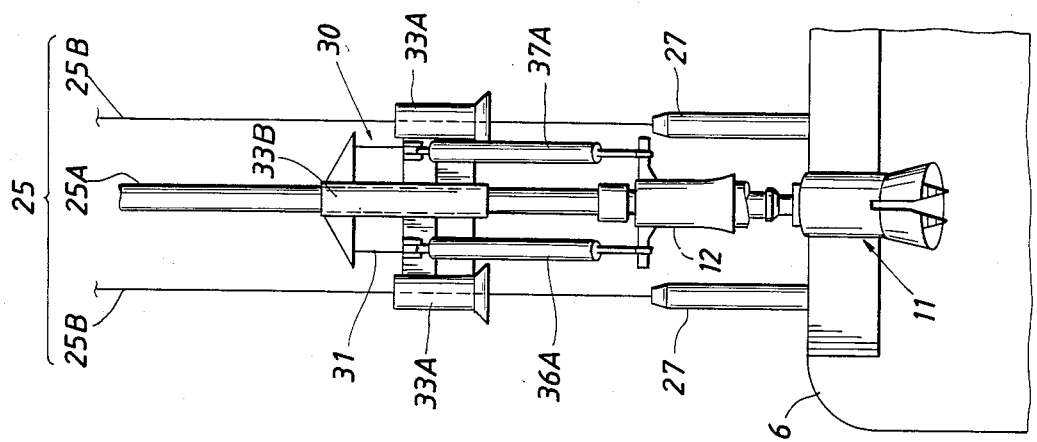
FIG. IV
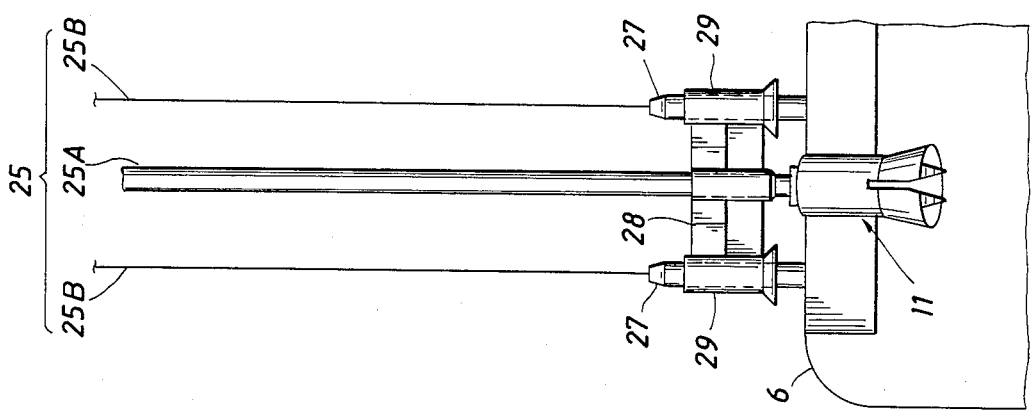
FIG. III
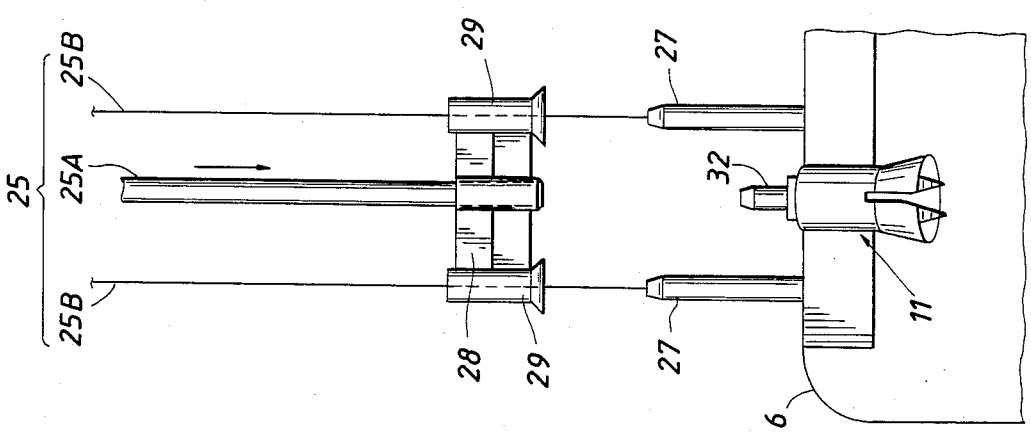
FIG. II

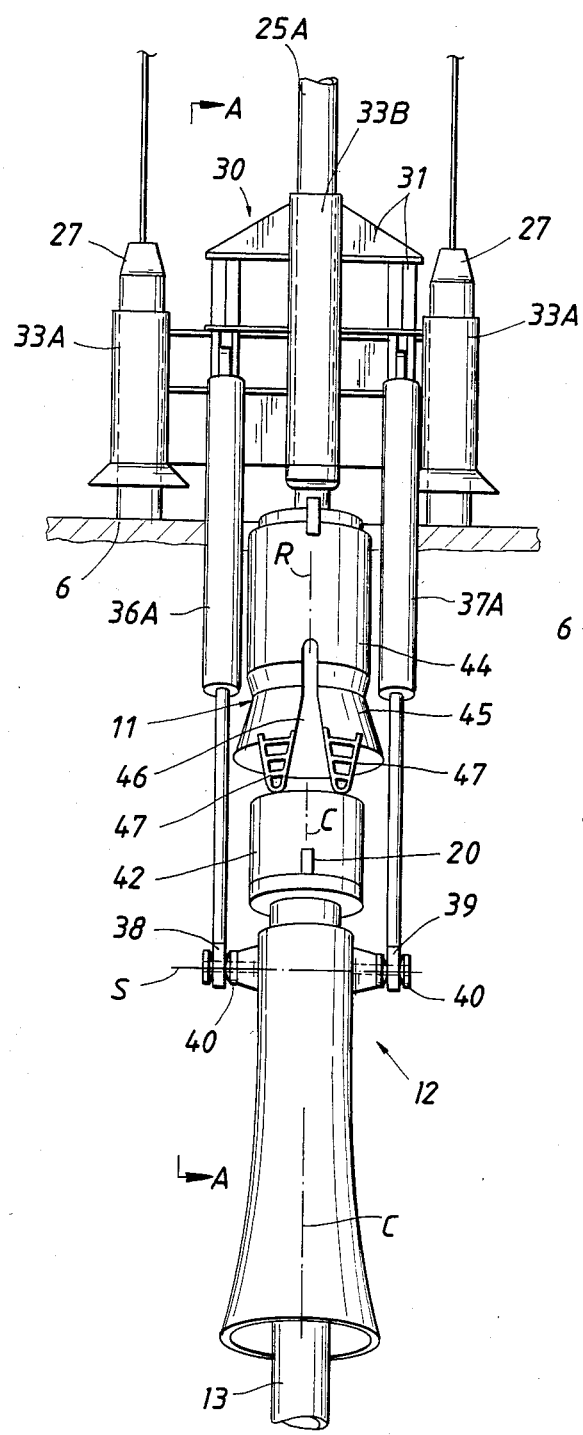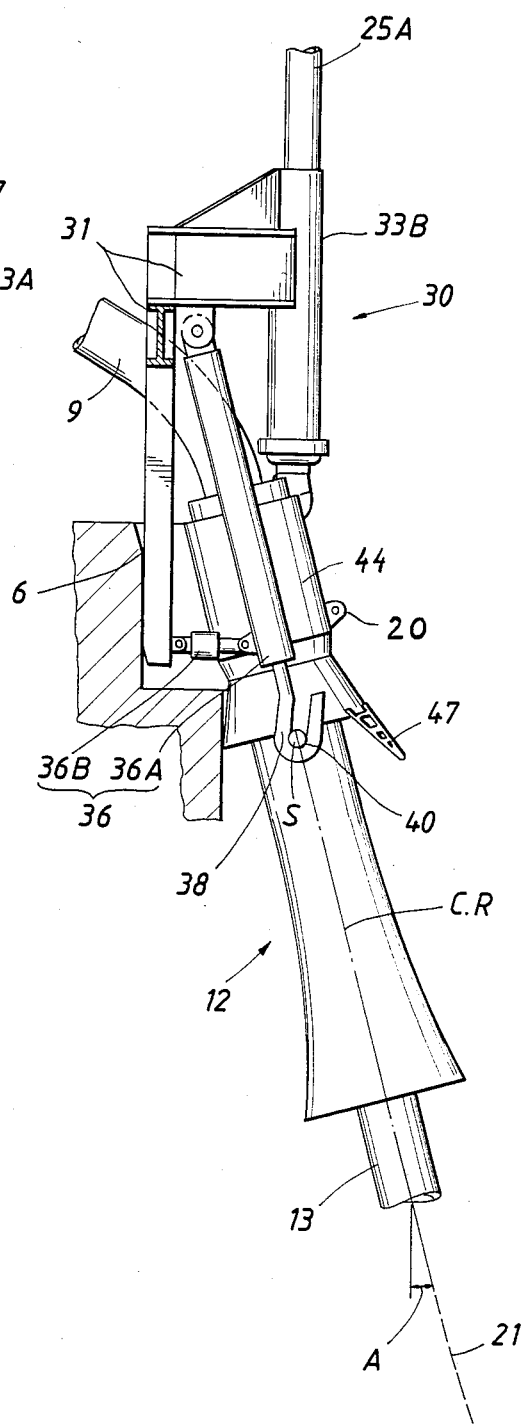

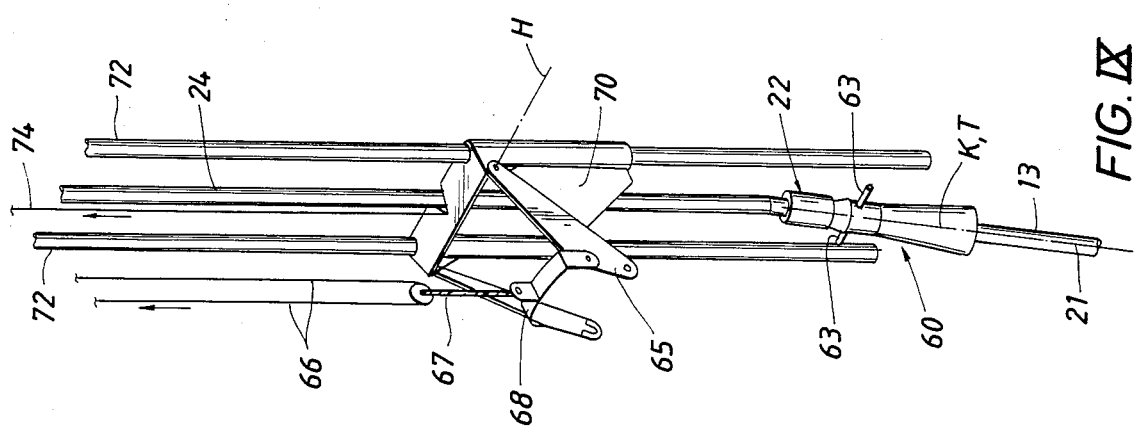
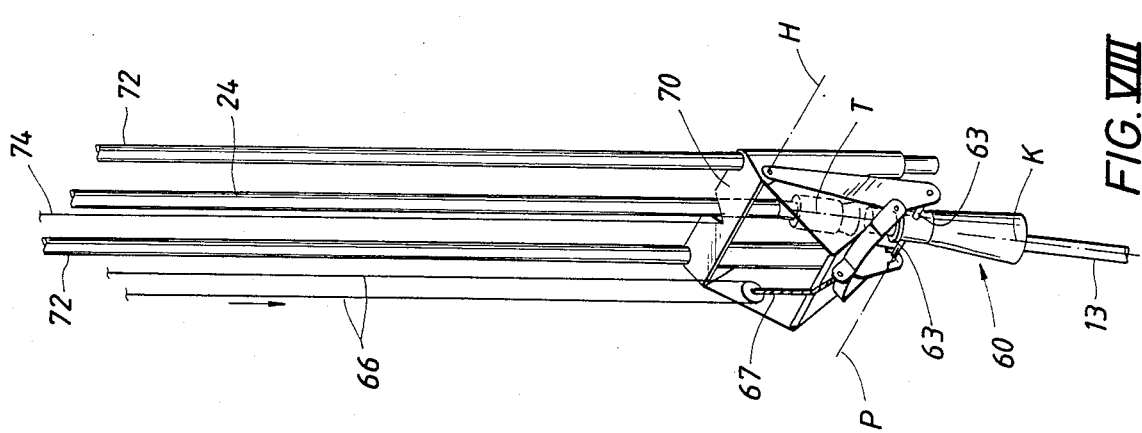
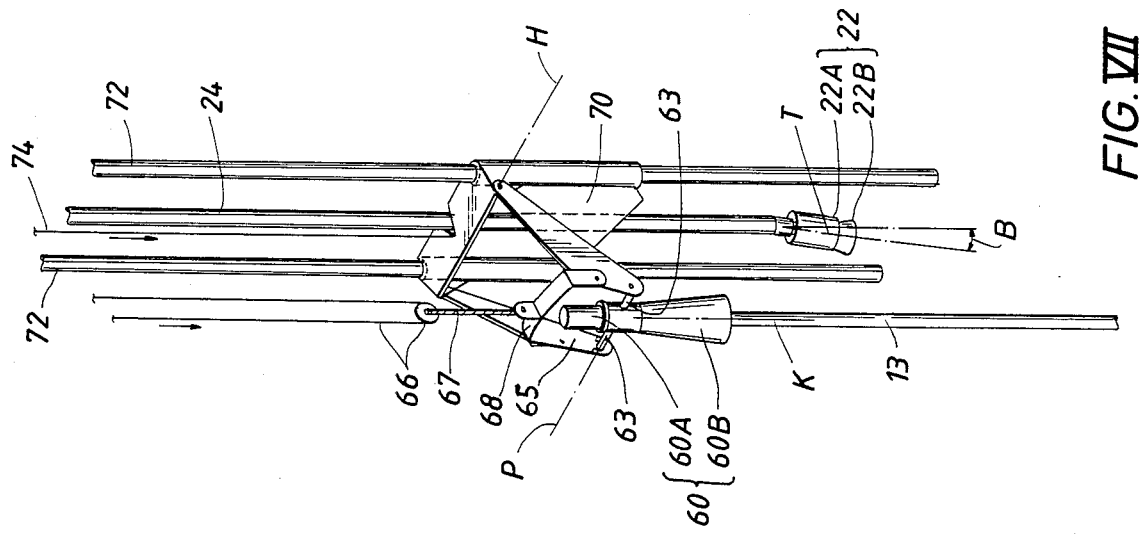

METHOD AND APPARATUS FOR THE INSTALLATION OF A HOSE BETWEEN A PLATFORM AND A SUBMERGED BUOY

BACKGROUND OF THE INVENTION

1. Field of the Invention

The invention relates to a method and apparatus for the installation of a catenary hose between a floating platform and a submerged buoy located at the top of a substantially vertical riser connected to the water bottom.

2. Description of the Prior Art

It is usual in offshore oil and gas production, if the water is too deep for the installation of a production platform standing on the sea bed, to employ floating production platforms linked by a hose system to the oil and/or gas wells on the sea bed.

U.K. Patent Specification No. 1,452,916 discloses the linking of a floating platform to a submerged buoy by means of one or more catenary hoses which are each joined at one end to the platform and provided at the other end with an end piece secured to a connector on the buoy. If such a production system is installed, it is possible during good weather to pull any hose from the platform to the buoy with the aid of one or more pulling cables, after which divers can, if required, secure the end piece of the hose to the connector on the buoy.

It is, however, often desirable to install the hoses during less favorable weather conditions.

SUMMARY OF THE INVENTION

The object of the invention is to provide an installation method for the installation of a catenary hose between a floating platform and a submerged buoy, which method can also be carried out in rough seas.

The installation method according to the invention thereto comprises the following steps:

positioning a ship above the buoy, placing a substantially vertically oriented guide system between the ship and a guide post positioned on the buoy at a pre-determined location relative to the connector on the buoy, linking the end piece secured to one end of the hose to a remotely controlled manipulator forming part of a submersible device, bringing the submersible device into contact with the guide system near the top end thereof, lowering the submersible device along the guide system on the guide post, coupling the hose at its other end to a pipe connected to the platform, pulling the end piece into the connector with the aid of the manipulator and rigidly coupling the end piece to the connector, disconnecting the manipulator from the end piece, raising the submersible device, disconnecting the guide system from the guide post, and lifting the guide system up to the ship.

In a suitable embodiment of the present invention, the hose is provided at its other end with a second end piece suitable for being coupled to a second connector at the end of the pipe connected to the platform. The second end piece is connected to the second connector by first pivotally linking the end piece to a bearing member which is movably secured to a lowerable frame that is positioned above the water surface and cooperates with a substantially vertical guide rail located along a side wall of the platform, the end piece being pivotable with respect to the bearing member about a pivot axis of rotation which is perpendicular to the plane containing the catenary described by the hose. The frame is then lowered along the guide rail until it is near the second connector, whereupon the end piece is secured to the connector by moving the bearing member upward relative to the frame. The end piece is then detached from the bearing member and finally the frame is pulled up along the guide rail to above the water surface.

These and other features, objects, and advantages of the present invention will become apparent from the following detailed description, wherein reference is made to the Figures in the accompanying drawings.

BRIEF DESCRIPTION OF THE DRAWINGS

FIG. I shows schematically a step of an installation procedure according to the invention, in which a guide system is lowered onto a submerged buoy.

FIG. II shows in detail the encircled part of FIG. I, seen in the direction of arrow 1 in FIG. I.

Figure 1:
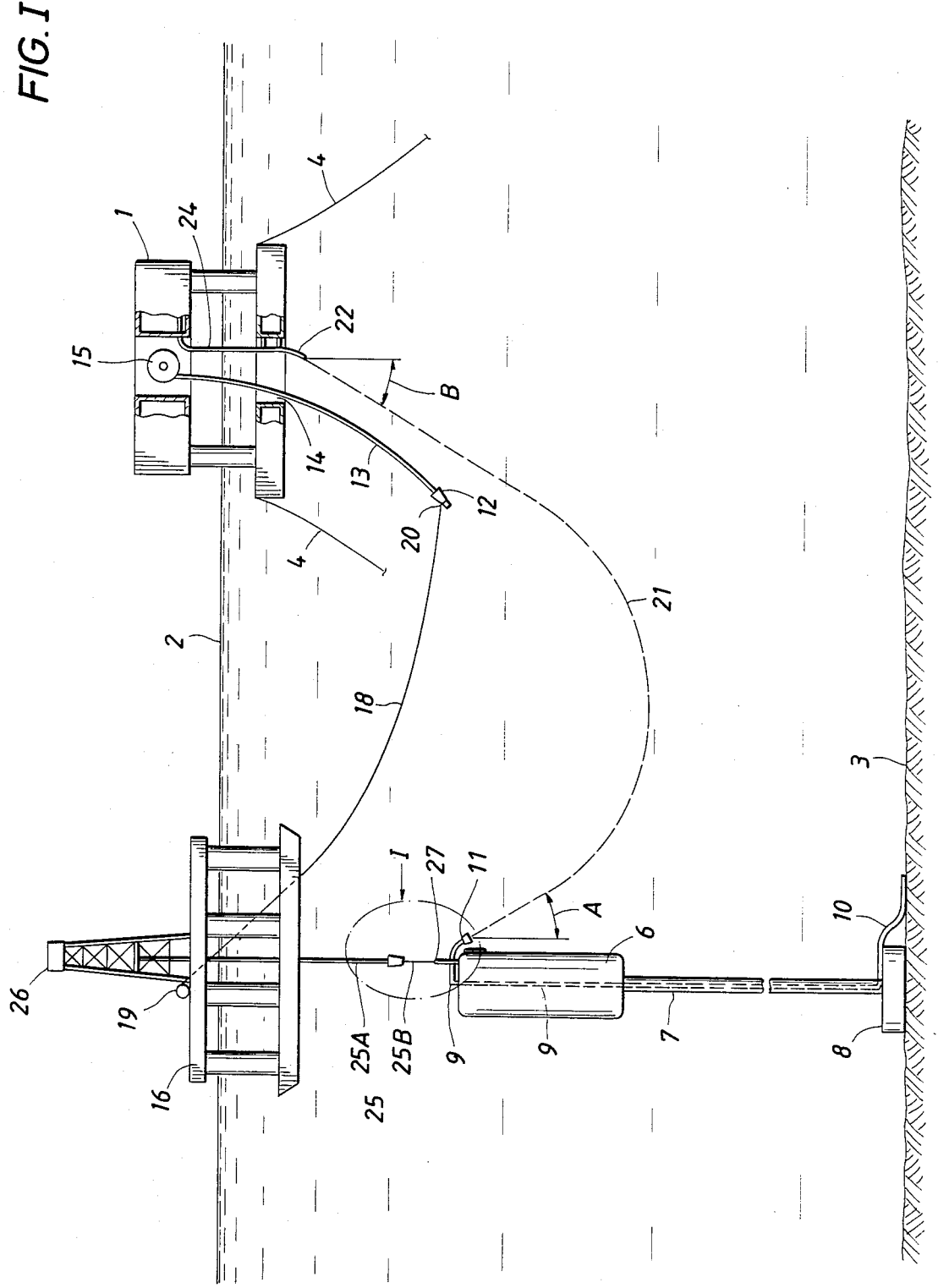

FIG. III shows the guide system of FIG. II after it has been lowered onto the buoy.

FIG. IV shows the lowering of a submersible device onto the buoy.

FIG. V shows on a larger scale the submersible device of FIG. IV after it has been lowered onto the buoy.

FIG. VI is a cross section taken along line A—A of FIG. V of the submersible device shown in FIGS. IV and V after it has been employed to couple a first end piece of a catenary hose to a connector located on the buoy.

FIG. VII is a perspective view of the lowering of a second end piece of the catenary hose with the aid of a frame that can be lowered along guide rails connected to the platform.

FIG. VIII shows the frame shown in FIG. VII while being employed to couple the second end piece to a connector connected to the platform.

FIG. IX shows the frame shown in FIGS. VII and VIII while it is being pulled up along the guide rails after performing the coupling procedure.

DESCRIPTION OF THE PREFERRED EMBODIMENT

FIG. I shows a platform 1 floating on the water surface 2 and anchored to the water bottom 3 by a number of anchor cables 4. The platform 1 contains apparatus (not shown) for treating and pumping oil and/or gas. At some distance from platform 1 is a submerged buoy 6 which is located at the top of a vertical riser 7 secured at its bottom to a base 8 on the water bottom 3. Through the riser 7 and the buoy 6 runs a pipe 9 connected at its bottom to a pipe 10 lying on the water bottom 3 and connected to one or more underwater wells (not shown), from which oil and/or gas is produced. The pipe 9 is provided at its top with a connector 11, hereafter called the first connector 11. The first connector 11 is adapted for coupling to a first end piece 12 of a hose 13. In the situation shown, the hose 13 is unrolled from a reel 15 on the platform 1 and lowered into the water through a central opening 14 in the platform 1. At the same time, the first end piece 12 is pulled to a floating work ship 16 above the buoy by a pulling cable 18 which cooperates with a winch 19 on the work ship and which is secured at one of its ends to a drawing eye 20 secured to the circumference of the first end piece 12.

In FIG. I a dashed curve represents the mathematical axis of a catenary 21 formed by the hose 13 after it has been secured by the method according to the invention between the first connector 11 on the buoy and a second connector 22 located at the bottom end of a pipe 24 on the platform 1. As shown in the drawing, near the first connector 11 the mathematical catenary 21 makes an angle A relative to the vertical, while near the second connector 22 the catenary makes an angle B relative to the vertical. The form of the catenary 22 and the angles A and B can be calculated beforehand by a method known in the art. FIG. I also shows how a guide system 25 is lowered from a tower 26 on the work ship 16.

As can also be seen from FIG. II, the guide system 25 comprises a guide-rod string 25A and a pair of parallel guide cables 25B, which are secured at their bottom ends to a pair of guide posts 27 on the buoy 6. The guide cables 25B are secured at their top ends to a tensioning mechanism (not shown) on the ship 16. The guide-rod string 25A is guided along the guide cables 25B by a guide member 28 comprising two tubular guide elements 29 located around the guide cables 25B. The guide posts 27 are located relative to the first connector 11 such that as soon as the guide elements 29 have slid completely over the guide posts 27 (see FIG. III), the bottom end of the guide-rod string 25A embraces a guide pin 32 (see also FIG. VI). The bottom end can then be anchored to the guide pin 32 by a bayonet connector (not shown), after which the guide member 28 is slid back along the guide system 25 to the water surface.

Subsequently, a submersible device 30 (see FIGS. IV, V and VI) is positioned near the top of the guide system 25, the device 30 comprising a frame 31 provided with a set of tubular guide elements 33A and 33B cooperating with the guide cables 25B and the guide-rod string 25A, respectively. The device 30 is also provided with a remotely controlled manipulator (36, 37) which, as can be seen from FIGS. V and VI, comprises two sets of hydraulic cylinders 36 and 37. Each set 36, 37 comprises two cylinders 36A-B and 37A-B, respectively, which are each pivotally connected at one end to the frame 31 and near the other end to each other. One of the hydraulic cylinders 36A, 37A of each set 36, 37 is provided at its bottom end with a hook 38, 39, respectively.

At either side of the first end piece are located pivots 40 designed to cooperate with the hooks 38 and 39 of the manipulator 36, 37. The pivots 40 are located such that, after the end piece 12 has been linked to the manipulator 36 by suspending the pivots 40 in the hooks 38 and 39, the end piece 12 can rotate relative to the manipulator 36 about a pivot axis S, which is perpendicular to the plane defined by the catenary 21 (see FIG. I).

In the method according to the invention, the pivots 40 are suspended in the hooks 38, 39 before the lowerable submersible device 30 is lowered from the ship 16 along the guide system 25. This enables the pivots 40 to be mounted in the hooks 38 and 39 even in stormy weather conditions on account of the fact that the positioning of the pivots 40 can, if necessary, be done on deck with the aid of control lines and/or hydraulic equipment (not shown).

After the pivots 40 have been located in the hooks 38, 39, the submersible device 30 is lowered along the guide system 25. FIG. IV shows the device 30 during the lowering just before reaching the guide posts 27 on the buoy 6. The end piece 12 is shown in FIG. IV positioned in front of the guide rod string 25A.

FIG. V shows the submersible device 30 after its tubular guide elements 33A have been slid completely over the guide posts 27. In the illustrated situation the end piece 12 is maneuvered into a position such that the central axis C of a tubular end portion 42 of the end piece 12 is substantially aligned with the central axis R of a tubular portion 44 of the connector 11.

The tubular portion 44 of the connector 11 fits coaxially around the tubular portion 42 of the end piece 12. The connector 11 is also provided with a funnel-shaped lead-in piece 45, through which the tubular portion 42 of the end piece 12 is slid in the following phase of the coupling procedure, in which the end piece 12 is pulled to the connector 11 by retraction of the cylinders 36A and 37A.

The lead-in piece 45 has an axial slit 46 in it, and in the prolongation of the side-walls of the slit 46 a set of guide members 47 are welded to the connector 11. During the retraction of the cylinders 36A and 37A, the drawing eye 20 welded to the end piece 12 is led along the guide members 47 into the slit 46, so that the tubular end portion 42 of the end piece 12 is slid in a pre-determined orientation into the tubular portion 44 of the connector 11.

FIG. VI shows the submersible device 30 after it has been employed to slide the tubular end portion 42 of the end piece 12 into the tubular portion 44 of the connector 11. It can be seen in FIG. VI that the central axis C of the tubular end portion 42 of the end piece 12 is tangential to the catenary 21 described by the hose 13. In order to prevent the weight of the end piece 12 creating bending stresses in the hose 13 when the end piece 12 is suspended by the pivots 40 in the hooks 38, the pivots 40 are positioned such that the pivot axis S intersects the central axis C of the end piece 12 at the center of gravity of the end piece 12. It can also be seen in FIG. VI that the central axis R of the tubular portion 44 of the connector 11, which coincides with the said central axis C, makes an angle A with the vertical and lies in the prolongation of the catenary 21. This orientation of the connector 11 in combination with the construction of the end piece 12 means that even during the coupling procedure the said central axes C and R are already almost parallel with each other.

After the end piece 12 has been rigidly coupled to the connector 11 by a locking device (not shown) in the connector 11, the hooks 38, 39 are unhooked from the pivots 40 by extending the cylinders 36A and 37A. The device 30 is subsequently hoisted along the guide system 25 to the ship 16 (see FIG. I). Finally, the guide system 25 is disconnected from the guide posts 27 and guide pin 32 on the buoy 6 and hoisted up.

FIGS. VII, VIII and IX show how the second end piece 60 located at the other end of the hose 13 is coupled to the second connector 22. The second connector 22 is secured at its bottom end to the pipe 24 connected to the platform 1. The second connector 22 comprises a tubular portion 22A and a funnel-shaped lead-in portion 22B. The tubular portion 22A fits coaxially around a tubular end portion 60A of the second end piece 60. The second end piece 60 is also provided with a conical sleeve 60B which serves to limit any bending of the section of the hose 13 situated near the end piece 60. On either side of the conical sleeve 60B are secured two pivots 63 which define a horizontal pivot axis of rotation P which intersects the central axis K of the tubular end portion 60A of the substantially rigid end piece 60 at the center of gravity of the end piece 60. This means that if the end piece 60 is suspended at the pivots 63, the central axis K of the tubular end portion 60A will always be tangential to the catenary 21 described by the hose 13. FIG. VII shows that the central axis T of the tubular portion 22A of the second connector 22 is at angle B to the vertical, and, as can be seen from FIG. IX, lies in the prolongation of the catenary 21 described by the hose 13 when the hose 13 is secured between the first and second connector 11 and 22 respectively (see also FIG. I).

FIG. VII shows how the second end piece 60 is lowered from the deck of the platform 1 to the second connector 22. The pivots 63 are hereby secured to hooks (not shown) which form part of a bearing member 65, such that the second end piece 60 is pivotable with respect to the bearing member 65 about the pivot axis of rotation P. The bearing member 65 is secured to a hoisting mechanism 66 by a chain 67 and a yoke 68. The bearing member 65 is also secured to a lowerable frame 70, such that the bearing member 65 is pivotable about a pivot axis of rotation H which is parallel to the pivot axis of rotation P and perpendicular to the plane defined by the catenary 21 (see FIGS. I and IX).

In the situation shown in FIG. VII, the frame 70 is moved downwards along a pair of guide rails 72 secured to the platform 1 by paying out a hoisting cable 74. The hoisting mechanism 66 is paid out at the same speed, so that the bearing member 65 remains in the almost horizontal position shown.

FIG. VIII shows the frame 70 after it has reached the bottom of the rails 72. Paying out of the hoisting cable is now stopped and the bearing member 65 is now rotated about the axis of rotation H with respect to the frame 70 by continuing the paying out of the hoisting mechanism 66 until the central axis K of the tubular end portion 60A of the second end piece 60 has been substantially aligned with the central axis T of the tubular portion 22A of the second connector 22. The tubular portions 60A and 22A are then telescoped together by moving the bearing member 65 and the frame 70 upwards at the same time. After the second end piece 60 has been locked to the second connector 22, the hooks of the bearing member 65 are unhooked from the pivots 63. As shown in FIG. IX, the frame 70, with the bearing member 65 rotated to a horizontal position, is finally hoisted to the water surface along the guide rails 72.

Preferably, each of the hose end pieces 12, 60 is coupled to the corresponding connector 11, 22 after both end pieces 12, 60 have been lowered to near the connectors 11, 22 since during the coupling stage the hose assumes the same predetermined mathematical catenary 21 as it describes in its operational configuration.

The invention is not restricted to the installation of a single hose 13 between a first connector 12 on the buoy 6 and a second connector 22 on the platform 1. If several hoses 13 are to be secured between the buoy 6 and the platform 1, then each hose 13 can be secured between a corresponding first connector 12 on the buoy 6 and a corresponding second connector 22 on the platform 1 by the installation method according to the invention. If desired, each hose 13 can contain several liquid conduits. In this case, the end pieces 12, 60 and connectors 11, 22 should be in the form of plug and socket units.

Finally, it is pointed out that, during the installation procedure, instead of unrolling the hose 13 from a reel 15 on the platform 1, the hose 13 can also, if so wished, be moved from a reel 15 on the work ship 16 to the floating platform 1.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. Method for the installation of a hose having a catenary shape and having a first and a second end between a floating platform and a submerged buoy located at the top of a riser, wherein said riser comprises a pipe provided at its top end with a connector secured to the buoy, the connector being adapted for receiving a first end piece located at said first end of the hose, characterized in that the method comprises the following steps:

positioning a ship above the buoy, placing a substantially vertically oriented guide system between the ship and a guide post positioned on the buoy at a pre-determined location relative to the connector on the buoy, providing the first end piece on its circumference with two opposite pivots which define a pivot axis of rotation perpendicular to the plane defined by the catenary shaped hose, providing a submersible device having a remotely controlled manipulator, providing said manipulator with a pair of hooks capable of cooperative linkage with said pivots, linking the hooks of the remotely controlled manipulator forming part of the submersible device with the pivots of the first end piece, placing the submersible device in operative engagement with the guide system near the top end thereof, lowering the submersible device along the guide system onto the guide post, coupling the hose at its other second end to a pipe connected to the platform, pulling the first end piece into a first connector forming a portion of the submersible device with the aid of the manipulator and rigidly coupling the first end piece to the first connector, disconnecting the manipulator from the first end piece, raising the submersible device, disconnecting the guide system from the guide post, and lifting the guide system up to the ship.

2. Method of claim 1 including, prior to the step of pulling the first end piece into the first connector with the aid of the manipulator, the further step of pivoting the first end piece with respect to the manipulator about a pivot axis of rotation which is perpendicular to a plane containing the catenary shaped hose.

3. Method according to claim 2, including the further steps of:

providing the first connector with a tubular portion having a central axis formed to fit coaxially around a tubular end portion having a central axis of the first end piece, pivoting said first end piece by carrying said pivots on the pair of cooperating hooks forming a part of the manipulator such that said first end piece is rotatable about said pivot axis of rotation, positioning the first end piece below the first connector by means of the manipulator, and sliding the tubular end portion of the first end piece into the first tubular portion of the connector by simultaneously moving both of said hooks in an upward axial direction relative to the tubular portion of the first connector.

4. The method of claim 3 wherein the step of positioning the first end piece below the first connector by means of the manipulator is done by, forming the tubular end portion of the first end piece such that the pivot axis of rotation defined by the pivots intersects the central axis of the tubular end portion of the end piece at the center of gravity of the end piece, positioning said central axis of the tubular end portion of the end piece tangential to a catenary axis formed by the catenary shaped hose when the hose is located between the platform and the buoy, and positioning the central axis of the tubular portion of the connector in the prolongation of said catenary axis, said connector located above said first end piece of said catenary shaped hose.

5. The method of claim 1 wherein the steps of linking the first end piece secured to one end of the hose to a remotely controlled manipulator forming part of a submersible device and placing the submersible device in operative engagement with the guide system near the top end thereof further includes the steps of;

unwinding the hose from a reel on the platform while said first end piece is pulled to the ship by a pulling cable, and linking the hooks of the manipulator device to the pivots connected to the first end piece while the submersible device is positioned above the water surface.

6. The method of claim 1 wherein the step of coupling the hose at its other second end to a pipe connected to the platform, where the other second end of said hose is provided with a second end piece adapted to be coupled to a second connector located at the end of the pipe connected to the platform, further includes the steps of;

pivotally linking the second end piece to a bearing member which is movably secured to a frame positioned above the water surface, said frame cooperating in slideable engagement with a substantial vertical guide rail located along a side wall of the platform, the second end piece being pivotable with respect to the bearing member about a pivot axis of rotation which is perpendicular to a plane containing the catenary shaped hose, lowering the frame along the guide rail to near the second connector, securing the second end piece to the second connector by moving the bearing member relative to the frame, disconnecting the bearing member from the second end piece, and pulling up the frame along the guide rail to above the water surface.

7. The method of claim 6 including, prior to the step of securing the second end piece to the second connector, coaxially moving a tubular end portion of the second end piece upward within a tubular portion of the second connector, the pivot axis of rotation of the second end piece located at the center of gravity of the second end piece, the second connector being positioned above the second end piece such that the central axis of the tubular portion of the second connector lies in a prolongation of the catenary axis formed by the catenary shaped hose when the hose is located between the second connector carried by the platform and the first connector carried by the buoy.

8. The method of claim 6 wherein the steps of lowering the frame and securing the second end piece to the second connector further include the steps of;

pivoting the bearing member relative to the frame such that the central axis of the tubular end portion of the second end piece is substantially aligned with the central axis of the tubular portion of the second connector, the second connector being located above the second end piece, said bearing member pivotally attached to the frame and pivotable with respect to the frame about an axis of rotation which is parallel to a pivot axis of rotation defined through two opposite pivots located on the circumference of said second end piece, moving the lowerable frame upwards along the guide rails, thereby telescoping the second end piece tubular end portion upward within the cooperating elements of the tubular portion of the second connector.

* * * * *